(12) United States Patent
Frazer

(10) Patent No.: US 7,665,389 B2
(45) Date of Patent: Feb. 23, 2010

(54) MULTITOOL WITH WIRE STRIPPING ELEMENT

(75) Inventor: Spencer Frazer, Lynnwood, WA (US)

(73) Assignee: SOG Specialty Knives & Tools LLC, White Plains, NY (US)

(*) Notice: Subject to any disclaimer, the term of this patent is extended or adjusted under 35 U.S.C. 154(b) by 0 days.

(21) Appl. No.: 11/743,074

(22) Filed: May 1, 2007

(65) Prior Publication Data

US 2008/0271254 A1 Nov. 6, 2008

(51) Int. Cl.
*B25B 7/22* (2006.01)
*H02G 1/12* (2006.01)

(52) U.S. Cl. .................................. 81/9.4; 7/128
(58) Field of Classification Search ........... 81/9.4, 81/9.44; 7/107, 118, 125, 127–129, 168; 30/123, 128, 161
See application file for complete search history.

(56) References Cited

U.S. PATENT DOCUMENTS

| | | | |
|---|---|---|---|
| 1,994,215 A | 3/1935 | Frederick | |
| 2,691,822 A | 10/1954 | Vaughan | |
| 3,058,377 A * | 10/1962 | Hardt | 30/91.2 |
| 3,257,722 A | 6/1966 | Caine | |
| 3,710,443 A * | 1/1973 | Stahel | 30/151 |
| 4,081,871 A | 4/1978 | Knuth | |
| 4,122,569 A * | 10/1978 | Hitchcock | 7/134 |
| 4,189,799 A | 2/1980 | Litehizer | |
| 4,426,778 A * | 1/1984 | Christie | 30/90.1 |
| 4,722,140 A | 2/1988 | Miceli | |
| 4,953,293 A | 9/1990 | Sterlacci | |
| 5,630,241 A * | 5/1997 | Chang | 7/107 |
| 5,735,005 A * | 4/1998 | Wang | 7/127 |
| D400,412 S | 11/1998 | Gold | |
| 6,038,723 A * | 3/2000 | Nabors et al. | 7/128 |
| 6,058,606 A | 5/2000 | Hepworth | |
| 6,089,125 A * | 7/2000 | Cheng | 81/9.44 |
| 6,243,901 B1 * | 6/2001 | Elsener et al. | 7/118 |
| 6,352,010 B1 | 3/2002 | Giarritta et al. | |
| 6,510,611 B2 | 1/2003 | Edwards et al. | |
| 6,813,981 B2 | 11/2004 | Urban et al. | |
| 6,990,702 B2 | 1/2006 | Rivera | |
| 7,216,431 B2 * | 5/2007 | Holliday et al. | 30/90.7 |
| 2004/0019974 A1 * | 2/2004 | Montague et al. | 7/128 |

FOREIGN PATENT DOCUMENTS

EP 980742 A1 * 2/2000

* cited by examiner

*Primary Examiner*—David B Thomas
(74) *Attorney, Agent, or Firm*—Michael F. Hughes; Hughes Law Firm, PLLC

(57) ABSTRACT

A tool member for a multitool which is configured to strip wire. The tool member has first and second members which in one form are pivotally attached at a common axis on the handle portion of a multitool where the tool member has an extended orientation and can be retracted into the channel region of the tool member.

10 Claims, 15 Drawing Sheets

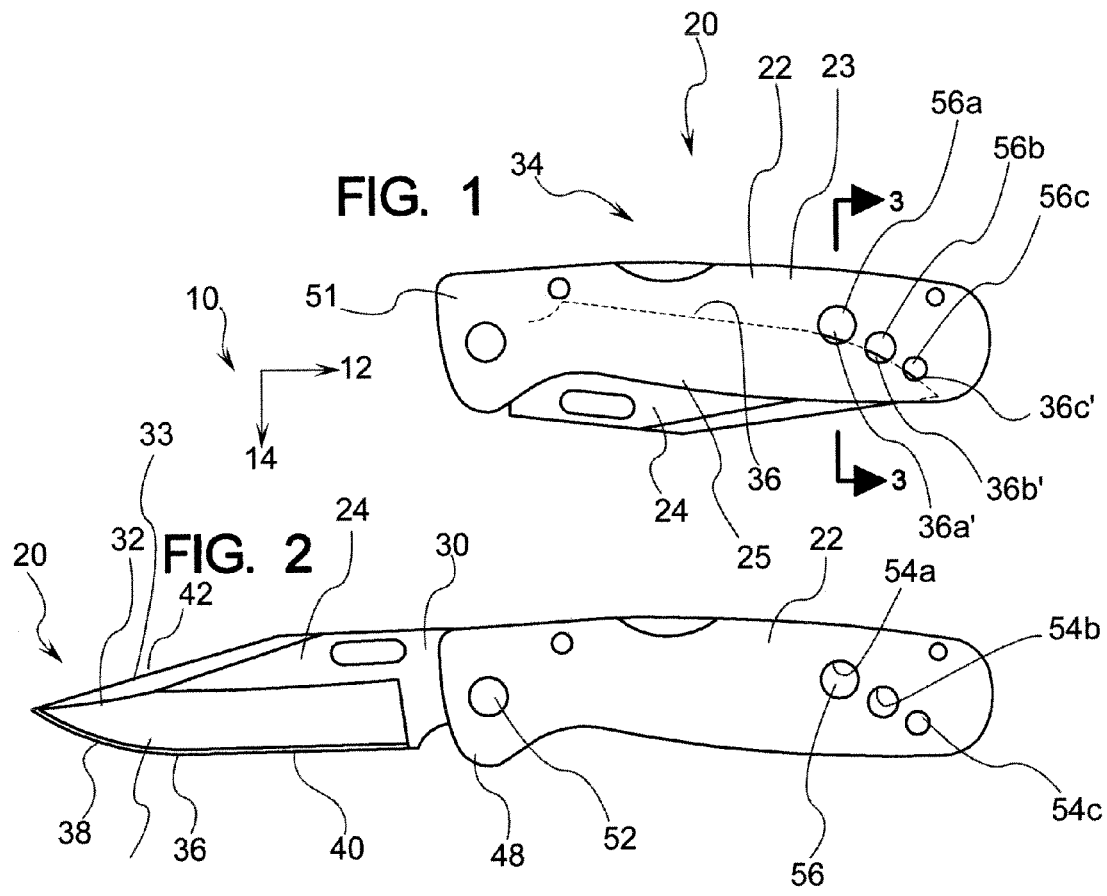
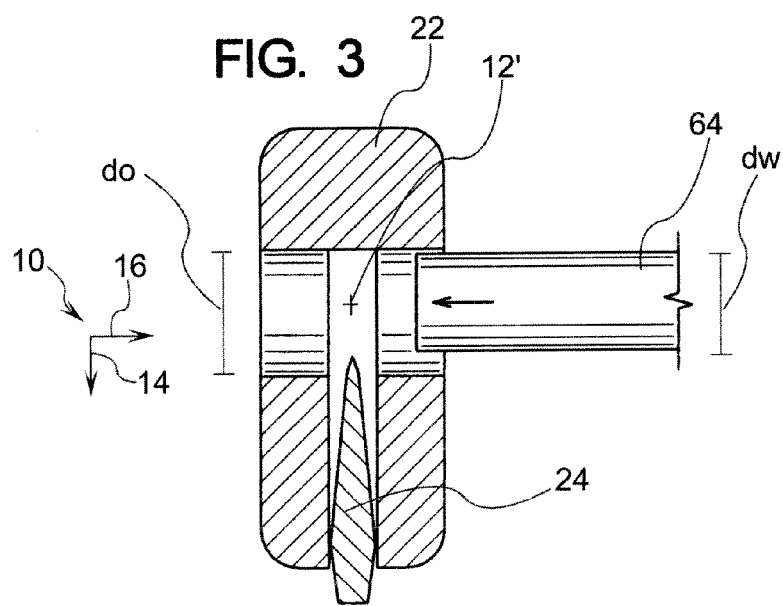

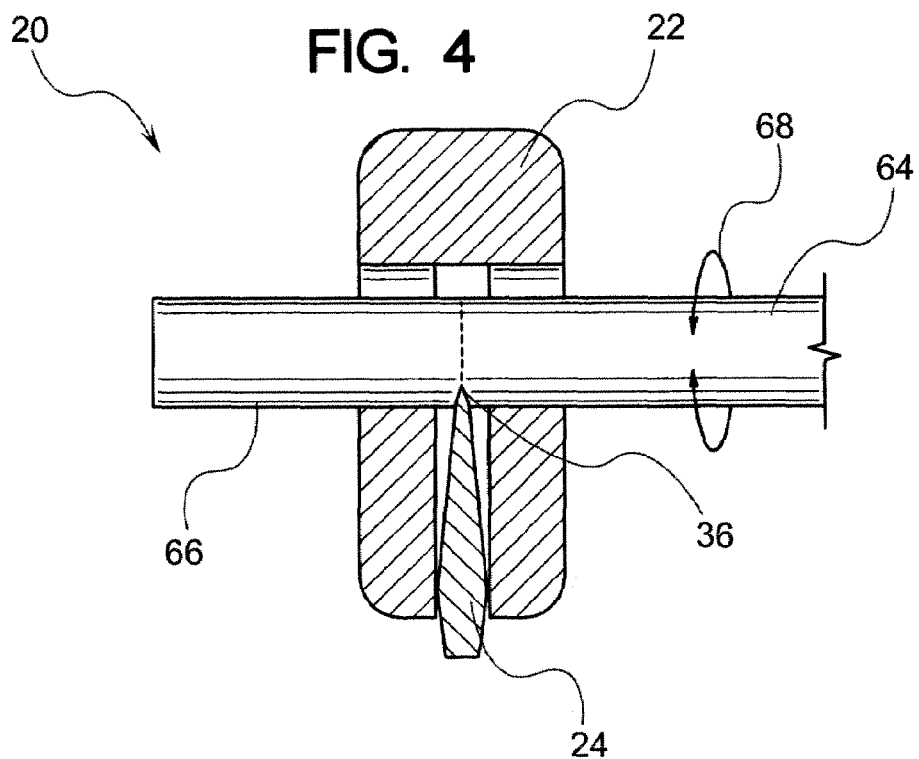
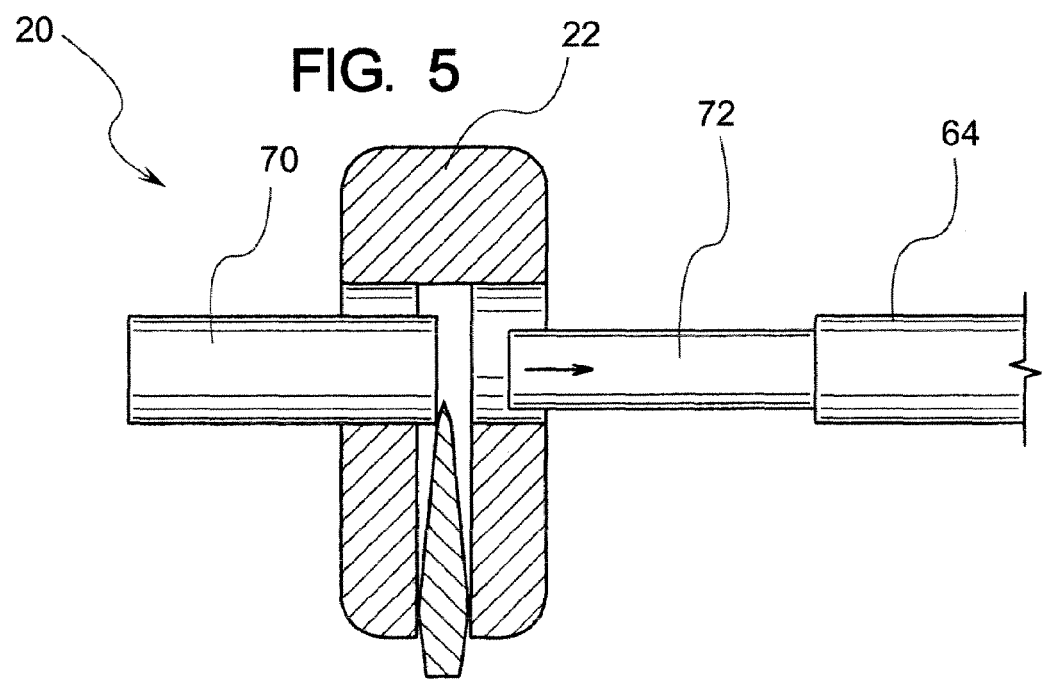

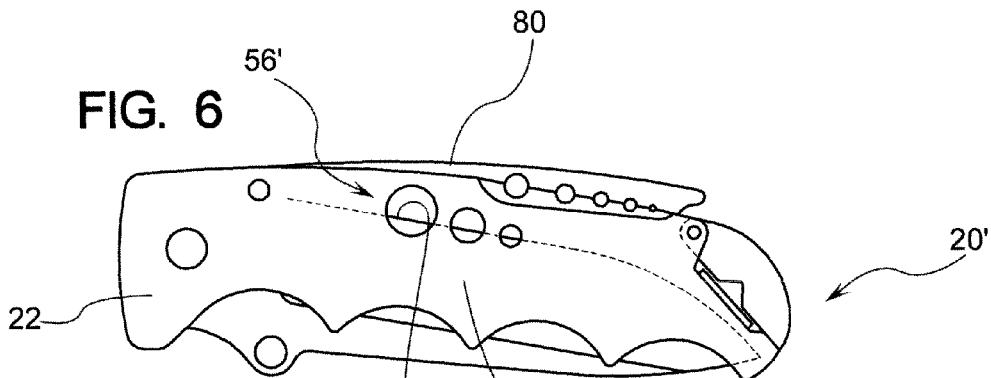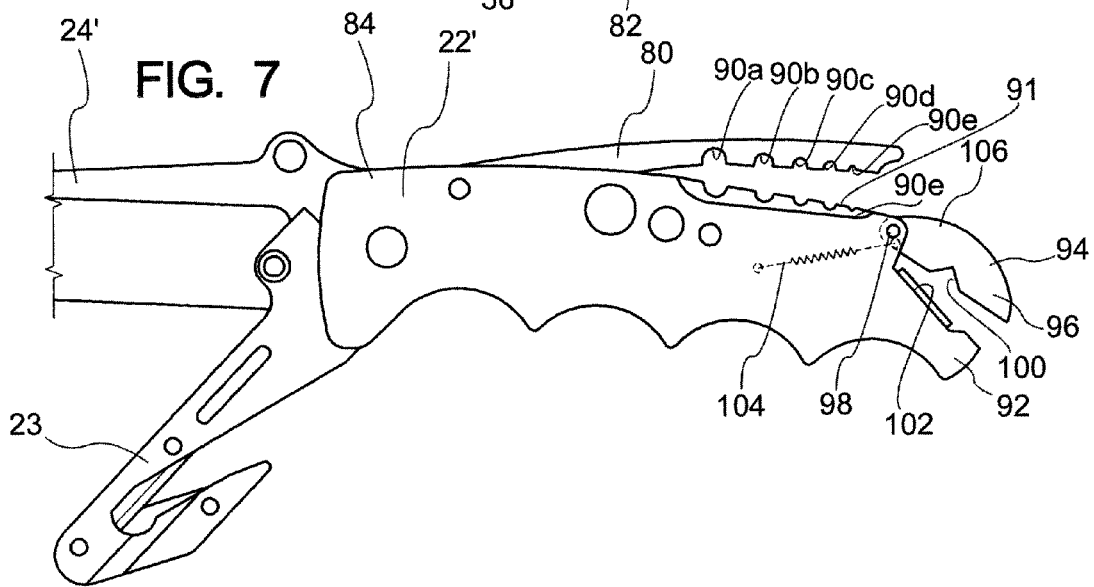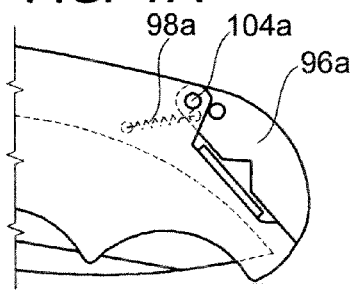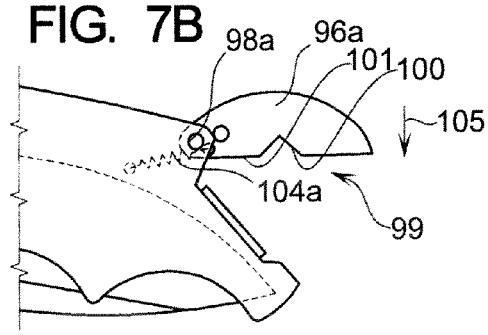

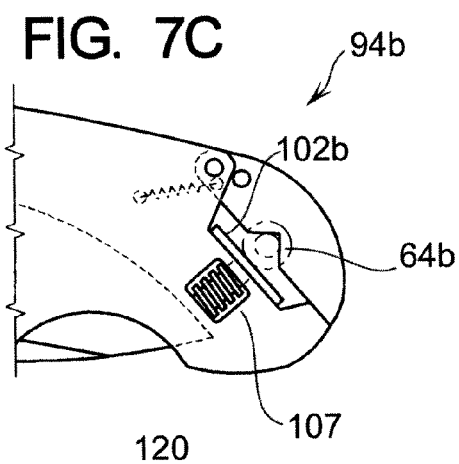
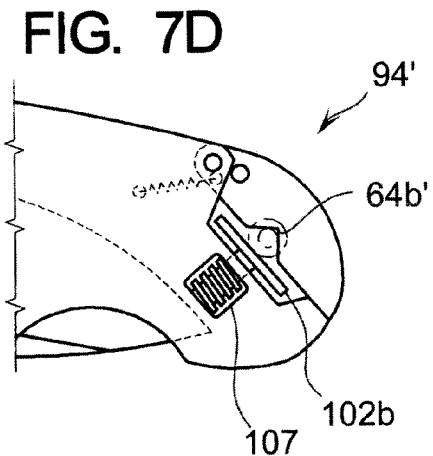
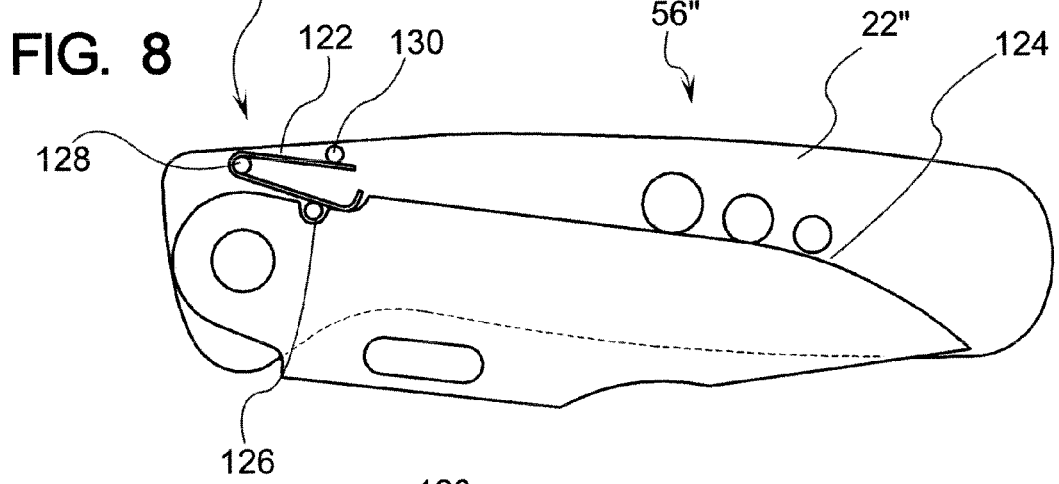
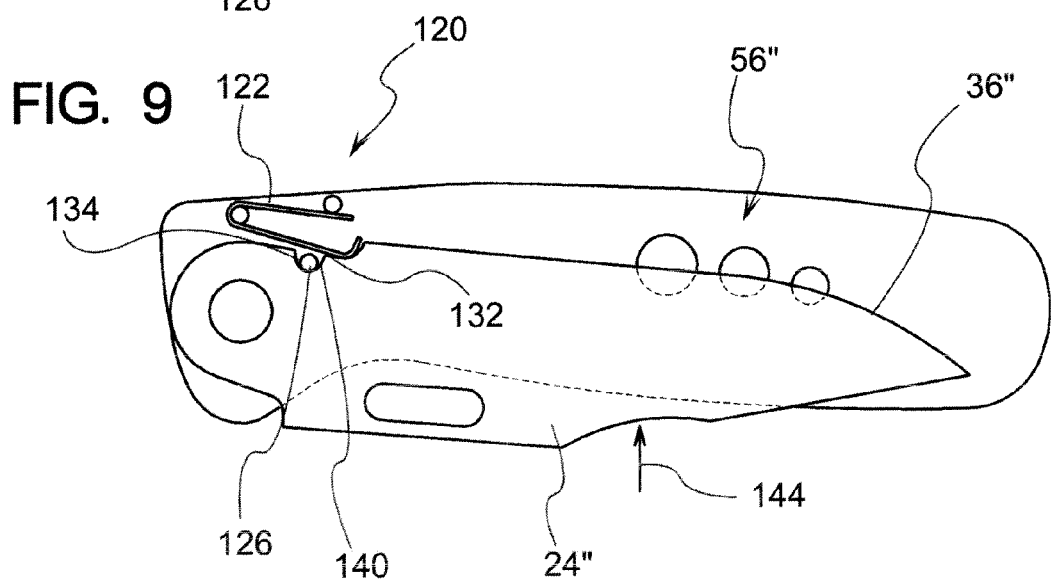

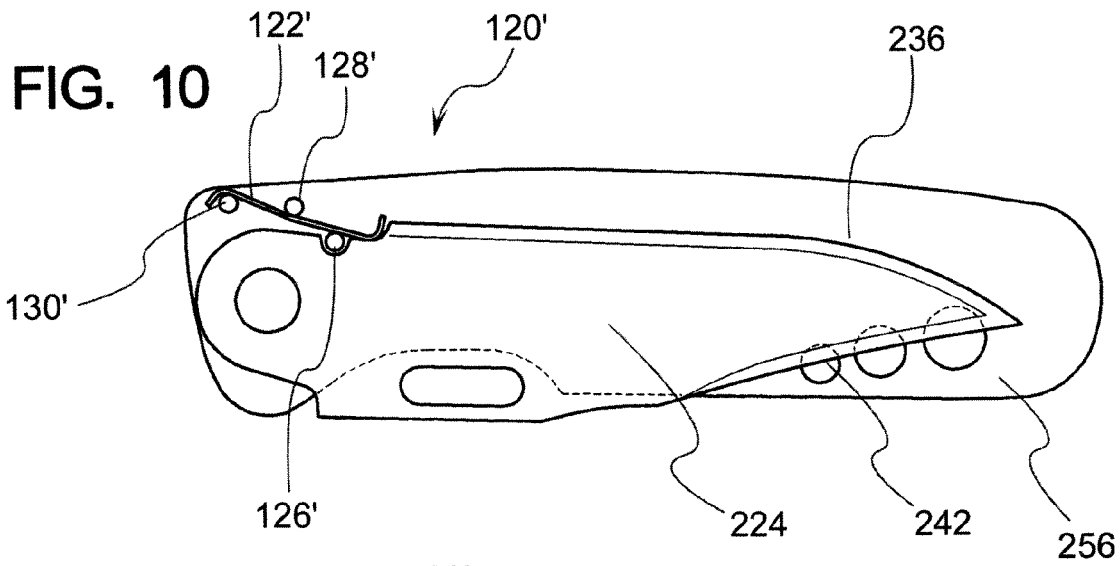
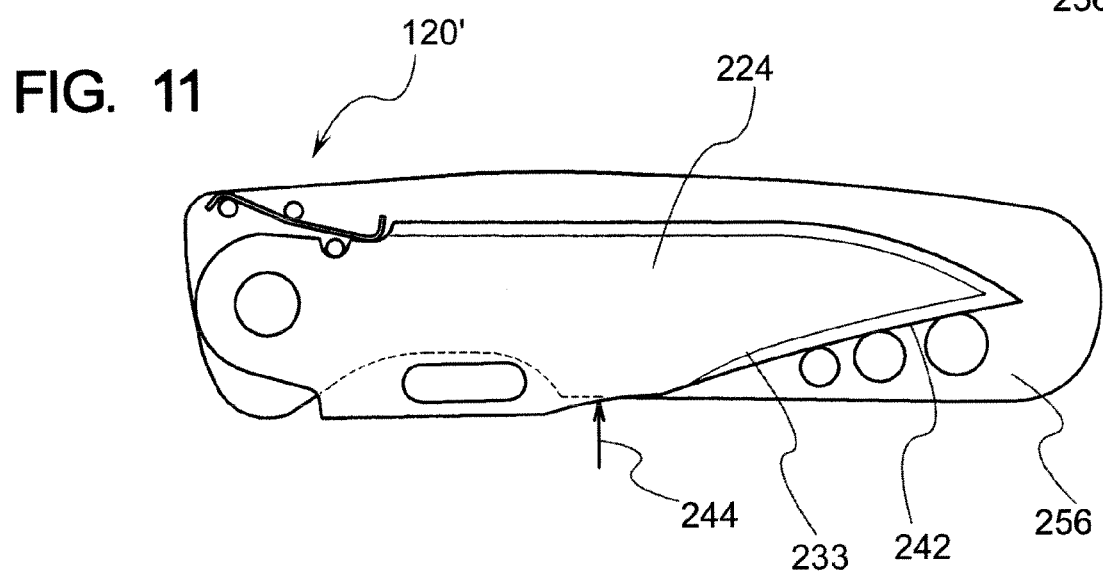

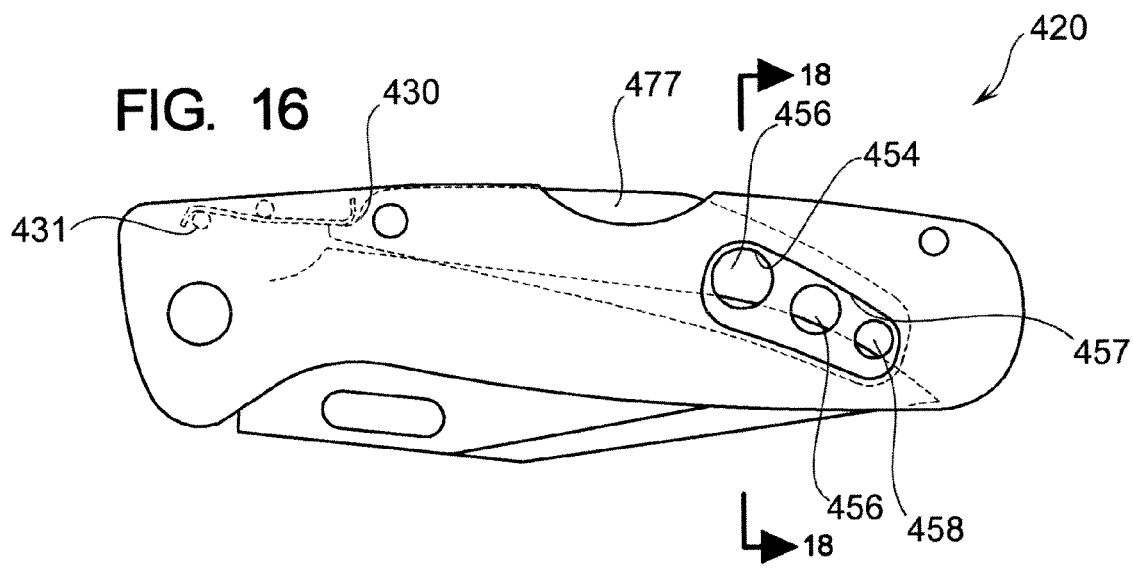
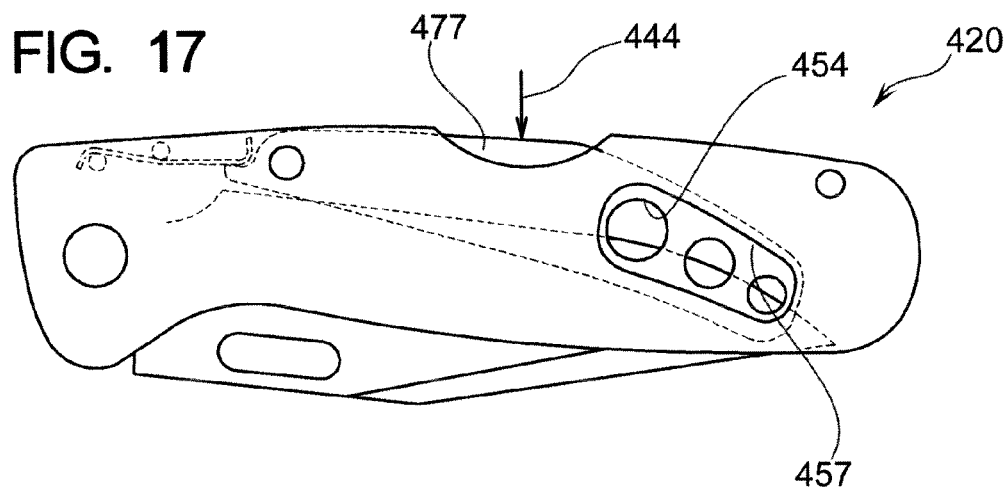
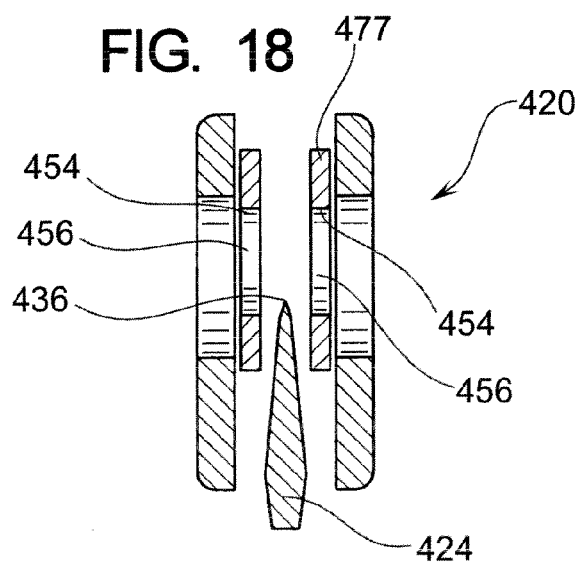

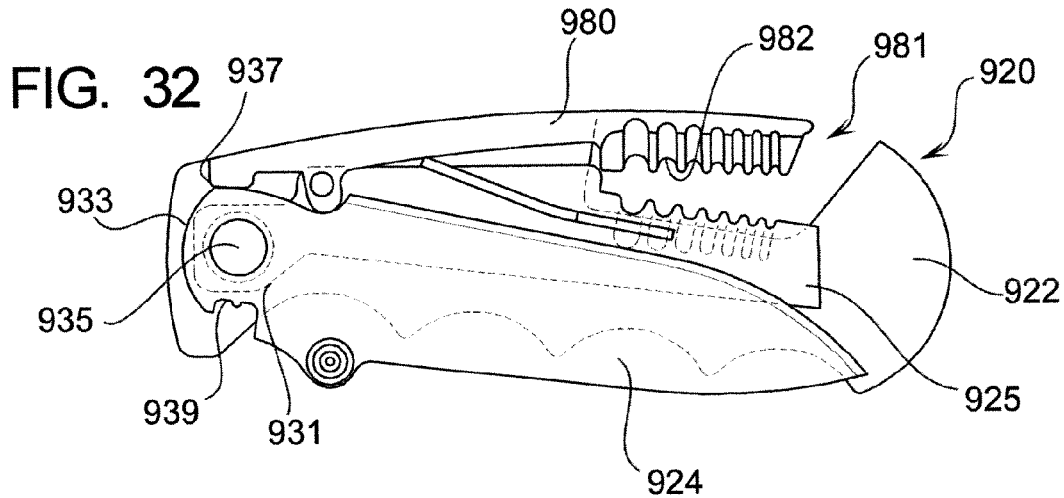
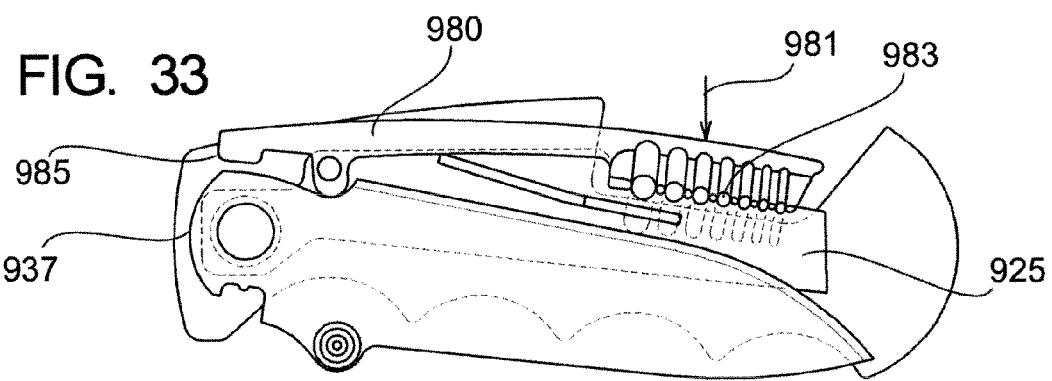
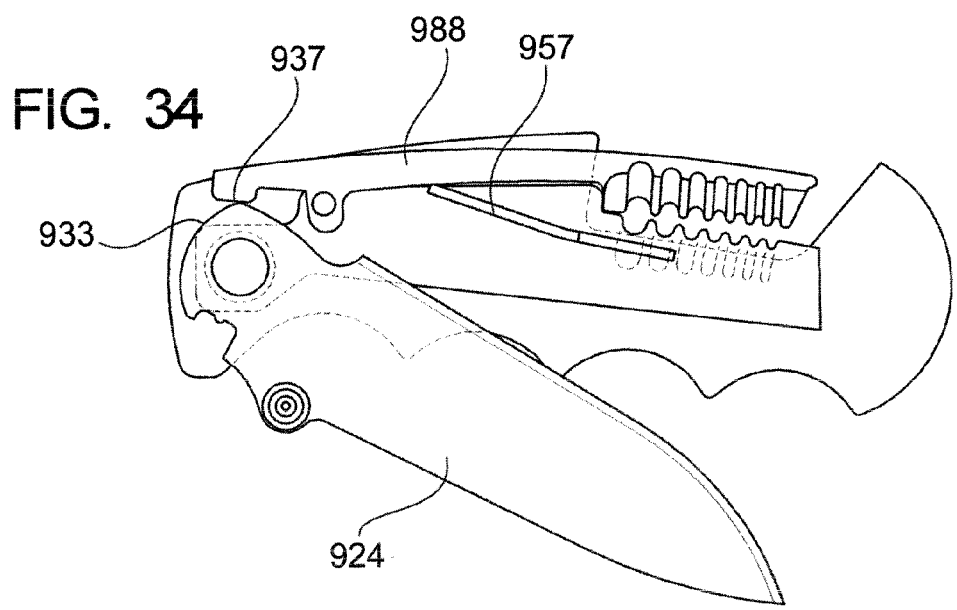

MULTITOOL WITH WIRE STRIPPING ELEMENT

BACKGROUND

Knives, particularly folding blade knives, have been utilized as a basic tool for numerous tasks that require any type of incising material. In fact, a knife is probably one of the most versatile tools available, where the conventional "pocket knife," as its name implies, indicates wide usage and availability to many people. However, a knife in its basic configuration does not restrict the amount of incision to material which is necessary in certain applications. People that work with insulated wire, such as electricians, farmers, handymen, construction workers, or individuals working with wire around the house or for their profession often require removing a portion of the insulation and leaving the underlying wire exposed, presumably for electrical conductivity such as insertion into a twist-on wire connector. However, this procedure generally requires a more surgical application of some form of incising device to cut through the outer insulation and leave the inner wire and not make substantial contact with the inner wire. Disclosed herein are various embodiments to provide the functionality and usefulness of a pocket knife while also providing wire stripping capabilities.

SUMMARY OF THE DISCLOSURE

Disclosed herein is a multitool configured to strip the insulation of wire from a core portion of the wire. The multitool has a pair of opposed jaw members and a first pivot swingably connecting the jaw members for movement relative to each other. Each of the jaw members has a working end portion extending from the first pivot in a first direction and a butt portion extending from the first pivot in a second, generally opposite direction. A first and second elongated handles are provided each having a channel therein. The jaw members being moveable relative to the handles between an open position in which the jaw member working end portions are exposed and a closed position in which the jaw members are substantially nested in the channels of the handles.

A wire stripping tool member is attached to first handle configured to be in a stored orientation within the channel region and an extended orientation where the wire stripping tool member is extended from channel region. The wire stripping tool member has first and second members each having wire engaging surfaces configured to incise insulation of the wire to remove it from the core portion of the wire.

The multitool further can have the wire engaging surfaces are positioned opposite one another where the wire engaging surfaces provide a plurality of slots narrowing in diameter to engage wires of different diameters. In one embodiment shown herein there is a stop member prevents the rotation of the first and second stripping members such that the first and second stripping members open with respect to one another at a prescribed angle.

The first and second members can each have locking surfaces configured to engage a lock bar attached to the handle. The multitool where the lock surfaces of the first and second members do not coincide in location when the first and second members are in an open orientation and the lock bar disengages the wire stripping tool member to allow the wire stripping tool member to be repositioned to the stored orientation.

The tool member is configured to strip the insulation of a wire from the core portion and configured to be positioned within a handle of a multitool. The wire stripping tool member has a first member and second member pivotally attached to a multitool each having a wire retaining surface configured to hold a wire therein.

The wire retaining surfaces of the first and second members are configured to coincide in location such that when the first and second members are in a closed orientation the wire retaining surfaces of the first and second members cooperate to cut the insulation of a wire placed therebetween for stripping of the insulation from the core portion of the wire. The wire stripping tool member is configured to fit within a handle region of the multitool when in a stored orientation.

BRIEF DESCRIPTION OF THE DRAWINGS

FIG. 1 shows the folding wire stripping knife in a closed orientation where the edge portion of the blade extends beyond the perimeter profile of the lateral openings;

FIG. 2 shows the folding knife in an open orientation;

FIG. 3 shows a cross-sectional view of one of the lateral openings where an insulated wire is inserted therethrough;

FIG. 4 shows schematically where the wire is rotated with respect to the blade to provide an incision circumferentially around the insulation of the wire;

FIG. 5 shows the end insulation portion being removed from the main body of the wire;

FIG. 6 shows a second embodiment where a plurality of additional wire stripping devices are attached to the main body of the folding knife;

FIG. 7 shows the second embodiment in an extended orientation with the various wire stripping portions in an open manner as well.

FIGS. 7A and 7B show the spring member of the rearward stripping device biasing the rearward stripping device from an open to a closed orientation.

FIGS. 7C and 7D show an adjustment mechanism for the rearward stripping device.

FIG. 8 shows another embodiment where a spring-like mechanism is positioned and is adapted to resist rotation to a fully closed orientation;

FIG. 9 shows the embodiment in a fully closed orientation where the edge portion breaks or extends within the lateral profile of the lateral openings of the openings within the handle;

FIG. 10 shows another embodiment where the wire stripping portion is in a rearward region of the blade and in one form, a spring like mechanism resists rotation to the fully closed orientation which substantially or completely positions the edge portion of the blade beyond the lateral profile of the openings FIG. 11 shows the blade in a fully closed orientation where the second edge portion is withdrawn from encroaching upon the lateral profile of the openings to allow a wire to pass therethrough.

FIG. 16 shows another embodiment where the surface defining the lateral opening is operatively configured to reposition with respect to the blade;

FIG. 17 shows the wire positioning member positioned in closer engagement to the blade where the blade is further positioned in the side profile of the open area defined by the lateral extending surfaces;

FIG. 18 is taken along line 18-18 of FIG. 16;

FIG. 32 shows another embodiment where a lock button bar is utilized to provide wire stripping capability;

FIG. 33 shows a lock back bar in closer engagement to a base portion which in one form is a metallic insert in the handle;

FIG. 34 shows the cam surface in engagement with the cam engagement surface of a lock bar;

DESCRIPTION OF THE PREFERRED EMBODIMENTS

Figure 12A:
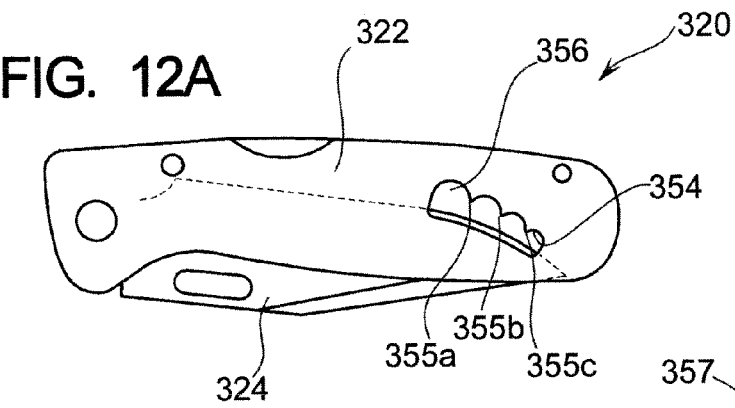
FIG. 12A shows another embodiment where the lateral opening has partially discrete sectors.

As shown in FIG. 1, there is a knife 20 comprising a main body/handle portion 22 and a blade 24. To aid in the description of the knife, an axes system is defined indicated at 10 where the axis 12 indicates a longitudinal axis and the axis 14 indicates a transverse axis. Referring now to FIG. 3, you can see that the axis 10 comprises a lateral axis 16. In general, the center longitudinal axis indicated at 12' as shown in FIG. 3 indicates a middle portion of the knife, where extending laterally in the direction 16 from the center axis 12' indicates laterally outward directions with respect to the knife 20.

Referring back to FIG. 1, it can be seen how the knife 20 is in a folded closed orientation. FIG. 2 shows the blade in an open configuration. In general, the folding knife 20 is a locking knife in most forms where the knife will lock in an open orientation. In general, the blade 24 comprises a base region 30 and a forward portion 32. The blade locking system 34 is of a general conventional design which can take a number of forms. In one form, it is a lock back design. Still referring to FIG. 2, the blade 24 has an edge portion 36 having a forward region 38 and a rearward region 40. The blade further can have a second edge portion 42 positioned on the opposing transverse side of the blade 24 which in some forms as described herein can serve a purpose for providing and incising ability for the sheath portion of a wire. The blade is further comprised of a forward region 31 and a rearward region 33.

Still referring to FIG. 2, the main body/handle region 22 comprises a forward region 48 and a rearward region 50 as well as an outer transverse region 23 and an inner transverse region 25. A blade attachment portion 51 is in the forward region having a pivot mount 52 where the blade 24 is pivotally attached thereto rotating about a lateral axis. Positioned in one form, in the rearward portion 50 of the main body 22, is a plurality of surfaces 54 defining lateral openings 56. Of course the lateral openings need not have surfaces extending exactly along the lateral axis, but generally extend in the lateral direction of the handle. The surfaces 54 are shown in the figures preceded with an alpha character "a," "b," and "c." However, when referring to the surfaces for purposes of discussion for description of this main embodiment, the reference to the numeric character 54 refers to all of these common features of a preferred embodiment. As shown in FIG. 1, the lateral openings 56a through 56c are orientated in a manner where the edge portion 36 of the blade 24 is partially exposed along the lateral axis and "breaks" or is positioned within the perimeter profile of the lateral openings 56. In other words, the blade has a transverse position where a portion of the blade indicated at 36a'-36c' is visible and breaks the plane defined by the surfaces 54a-54c.

Of course, as described herein, the main operating ability of the folding knife 20, is to shear off the insulation portion of a wire. In one form, when the blade is in a closed orientation as shown in FIG. 1, the natural closed orientation has a sufficient amount of clearance of the blade pass the lateral profile of the lateral holes to engage a certain prescribed depth of a wire inserted through holes to shear off the insulating portion. Of course, described herein are other ways of shearing off the insulating wire, such as applying a slight force to the blade to adjust the amount of penetration into the insulated portion, or alternatively using other portions of the blade such as the second edge portion 42 as described herein.

Now referring to FIG. 3, there will be a discussion of the operations of the apparatus and a method of stripping a wire. In FIG. 3, a wire is inserted into one of the lateral openings. In general the operator gauges the diameter of the wire $d_w$ and places the wire 64 into one of the lateral openings (if a plurality of openings are provided) that has a slightly larger diameter $d_o$ (or the near the same diameter for an interference fit). The operator gauges the amount of depth he desires to remove for the installation and releases the blade to an incising orientation as shown in FIG. 4. As shown in FIG. 4, the insulated wire 64 is properly positioned where the length 66 is to be removed and is positioned in one lateral region with respect to the blade 24. The operator of the tool then rotates the blade or the wire with respect to one another in a manner as indicated by the rotational vector 68 and the outer insulated portion 70 as shown in FIG. 5. It therefore is thereafter removed from the main portion of the insulated wire. As shown in FIG. 5 the inner conducting portion 72, such as the copper or other type of metal, or even perhaps other types of conductors or insulated or other types of wires having some form of stratification or an outer layer of strata is desired to be removed.

With the basic operation of the device in place, there will now be a discussion of other alternative embodiments with initial reference to FIGS. 6 and 7. As shown in this figure, the folding knife 20' again has a main body 22' and a blade portion 24' in this form, the unit further has an attachment such as a strap cutter/seatbelt cutter tool 23. Of course, other tools could be attached therewith to the handle region. In this form, the lock back portion of the blade on the main body which is going to lock stripping bar 80.

Basically, the embodiment as shown in FIGS. 6 and 7 show the same concept of the first embodiment in FIGS. 1 and 2 where the lateral openings 56' are positioned in a manner to operatively engage the edge portion 36 as shown in FIG. 6. As shown in this figure, it can be appreciated that in one form, the positioning of the lateral openings 56' is in the central area of the main body of the central area 82 of the main body 22'. Now referring to FIG. 7, it can be appreciated that the lock back bar/stripping bar 80 in one form is a spring-loaded like member which operates the lock portion of the blade 24'. In other words, the stripping bar 80 can engage or disengage at the area approximately indicated at 84 to close the blade. However, when the lock back is in the open orientation as shown in FIG. 7, a wire having insulation there around can be placed therein to engage one of the incising surfaces 90a-90e and the corresponding handle base surface 91. The operation of the locking mechanism of the lock back device at the area approximately indicated at 84 is well known in the art. As discussed herein there are two embodiments where the bar 80 operates as a lockback bar and another embodiment where the bar 80 operates as a safety device to prevent operation of the wire stripping process when the blade 24 is in an extended orientation. It should be noted that with a fixed blade designed, the stripper bar 80 as well as the rearward stripping device that before can be utilized where this orientation, the surfaces define the lateral openings would not be used to incise wire with the blade edge 36. It should be noted that the surfaces 90 (with the corresponding alpha characters as shown in FIG. 7) and the base surface indicated at 91 cooperate to incise wire were for example either one of the surfaces or accommodation thereof can actually conduct the cutting where the other surface supplies and opposing pressure thereto.

Now referring to the longitudinally rearward portion 92 of the handle/main body 22', there is a second cutting device which could also be included in the design. In one form, the rearward stripping device 94 in one form is a UTP cutting device where the arm 96 is typically attached at the pivot attachment portion 98 and the recess portion 100 is adapted to hold a wire therein. A blade region 102 in one form is placed on the handle and is positioned in a manner to oppose the recess 100 to fit a wire therein. A spring/biasing device 104 can be provided to keep the arm 196 in a closed orientation. Of course in other forms, the lever on FIG. 6 could be frictionally engaged to the base region at the pivot attachment portion 98.

As shown in FIGS. 7A-7D, there is a closer view of the rearward stripping device 94. In the form as shown in FIGS. 7A and 7B, the arm 96a has the biasing device 104a positioned in front of the pivot attachment portion 98a. In this form, as shown in FIG. 7B, the biasing device 104, which in one form is a helical spring, will constantly place a closing torque 105 upon the lever arm 96a.

Figure 38:
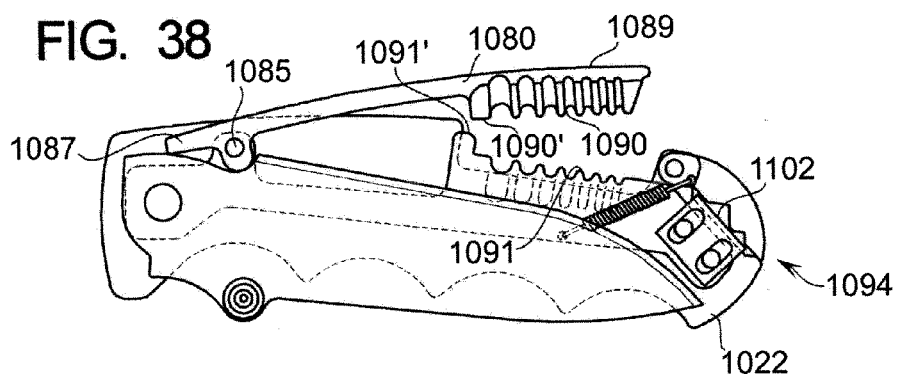
FIGS. 38-39 shows another embodiment similar to the stripper bar assembly above where the stripper bar engages the tang surface to close the stripper bar when the knife is in the extended orientation.
Figure 39:
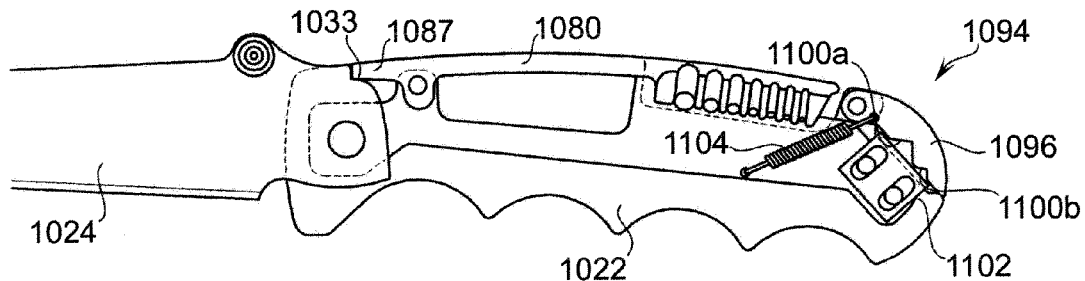
Figure 40:
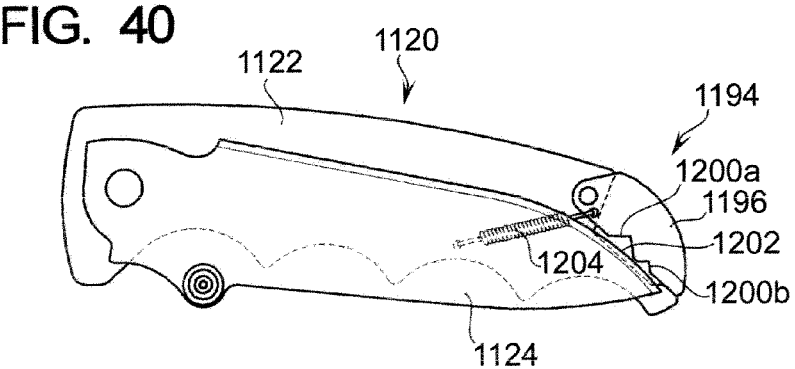
FIG. 40 shows another embodiment where the bar strips the wire with the knife blade.

Now referring to FIGS. 7C and 7D, there is shown another embodiment of the rearward wire stripping device 94d, where in this form, an adjustment mechanism 107 is provided where the blade region 102b can be positioned further outwardly to accommodate various wires, such as that schematically shown at 64b and 64b'. The adjustment mechanism 107 can be, for example, similar to the common system in an adjustable end wrench, or the system schematically shown in FIGS. 7C and 7D. In one form, the area indicated at 64b' is the blade region for cutting the insulation. Another form of this concept is shown in FIGS. 38-40 where there is shown another stripping device 1094 and 1194. FIGS. 38 and 39 show another embodiment where the cutting element 1102 is attached to the handle member 1022 and is adjustable by a variety of mechanisms known in the art. As shown in FIG. 39, in one form first and second retaining slots are provided at 1100a and 1100b. The slots can be utilized for different sizes of wire. It should be reiterated that the blade region can either be on the handle or on the arm 96.

FIG. 40 shows another variation where the cutting surface 1202 is a portion of the blade 1124. In this form, the slots 1200a and 1200b can be used for holding wire therein. The arm 1196 is of the same type of arm 1096 as in the previously mentioned figures. In a preferred form, some form of a spring member 1104 and 1204 is utilized to lever the arm 1196 and 1206 to a closed orientation.

In operation, the operator will position a wire in the recess region and most likely pressed out of his thumb along the outer surface 106 to supply sufficient pressure to incise the wire.

Now looking at FIG. 8, there is yet another embodiment of the knife 20" showing in one form a spring system 120 where the knife is in a folded orientation. In this form, the blade 24" is again pivotally attached to the main body 22". The spring system 120 in one form basically operates to maintain a preset force to close the blade 24" to certain orientation with respect to the lateral openings 56". In one form, the spring system 120 comprises a spring member 122 which can be for example biasedly positioned adjacent to a contact surface 124 of the blades 24". In one form, a spring stop 126 is attached rigidly to the main body 22" and basically provides a stop for some pre-tension in the spring member 122.

FIG. 9 shows the blade in a folded orientation as well but in a fully closed orientation. The leaf like spring as shown in FIG. 9, is positioned by the second and third stops 128 and 130. As shown in this figure, the knife in a compressed state where the blade edge portion 36" is breaking the profile of the longitudinal openings 56" to in a position to incise the insulation of a wire in a wire stripping orientation or close to such a position depending on the size and characteristics of the wire to be stripped. In this form, the operator can utilize a desired amount of pressure against the insulation for cutting of the same. It can be appreciated that the spring member 122 is in a compressed state in this orientation. In one form, the spring stop attachment 126 is engaged in the recessed region 132 which is defined by the recess surface 134 where the stop surface 140 of the spring stop attachment engages the base region 142 of the recess region 132. In this form, the spring stop attachment operates to limit the amount of penetration the knife blade encroaches and passes beyond the profile of the lateral openings 56". It can be appreciated that when the operator applies a force as indicated at 144, he can acquire a feel for how much pressure is required to overcome the pretension of the spring to have a desired degree of penetration on the insulation.

Now referring to FIGS. 10 and 11, there is shown yet another embodiment where it can be appreciated that another form of a spring biases member is shown. It is to be understood that a plurality of type of biasing type members can be utilized to resist the rotation of the blade to restrict the rotation of the blade in the various embodiments. Just to name a few examples, a torsional type spring could be applied, or a frictional type engagement of the blade could be utilized. A member positioned away from the rotational attachment but engaging the forward region of the blade could also possibly provide slight resistance for fully closing the blade. At any rate, it can be appreciated that any number of types of spring systems such as the system 120' could be employed. Again referring to FIG. 10, in this form, the spring member 122' in this form is more of a straight or slightly bent member but is positioned to have pretension in between the spring stop attachment 126" as well as the stops 128" and 130". Of course this type of spring arrangement could also be utilized with the embodiment as shown in FIGS. 8-9. However, referring back to FIG. 10, there is shown another form where the blade 222 again has an edge portion 236. However, the blade 224 further has a second edge portion 242 positioned in the rearward region 233 which in this form is sharpened sufficiently to incise plastic insulation or the outer portion of a wire. Basically, in one form of operating the user applies a force as indicated by the vector 244 to reposition the blade 224 and a compressed state where the blade is basically compressed in a similar manner as shown in the in FIG. 11. In this form, the second edge portion 242 is biased inwardly so a wire can be placed therein through the lateral openings 256. Thereafter, the operator can release the force placed upon the blade with respect to the main body 222 and the tension/stored energy of the spring system 120' will bias the blade to a cutting orientation where the second edge portion 242 engages the insulation of a wire inserted through one of the openings 256. In alternative forms, a variable resistance blade could be utilized where say for example one of the stop members 126', 128' or 130' can be repositioned (or more than one can be repositioned) to provide a variable amount of resistance. For example, as shown in FIG. 10, the stop member 130' can be repositioned in a clockwise manner to provide more tension upon the spring member 122", or alternatively (or in conjunction therewith) the stop member 126" could be repositioned with respect to the main body 222 to limit the amount of travel and depth of the interference of the blade portion 242 with respect to the lateral profile of the lateral openings 256 defined of course by the surfaces 254a-254c it should be noted that in this form, the edge portion 236 is free to remain sharp for various tools while the second edge portion 242 is utilized for stripping wire.

When the blade is in a closed orientation, this is defined to be a natural resting type of orientation with a blade positioned within the handle, or an orientation where pressure is applied to the blade to reposition the blade edge with respect to the lateral profile of the lateral openings.

Of course, it should be further noted that the lateral openings may not be perfectly in the lateral direction, but generally extend and have a lateral component thereof. The general purpose of the lateral openings is to allow a wire to pass therethrough to have the portion of the wire incised (or in some cases have the entire wire cut by using, for example, the embodiment in FIG. 10). It should be further noted that as shown in FIG. 10, when the knife is in an open orientation, the blade 224 can be closed with an object such a wire extended through one of the lateral openings 256 whereby the edge portion 236 can be utilized to completely cut through (or least cut a desired length) of the object, such as the wire extended therethrough.

Figure 12B:
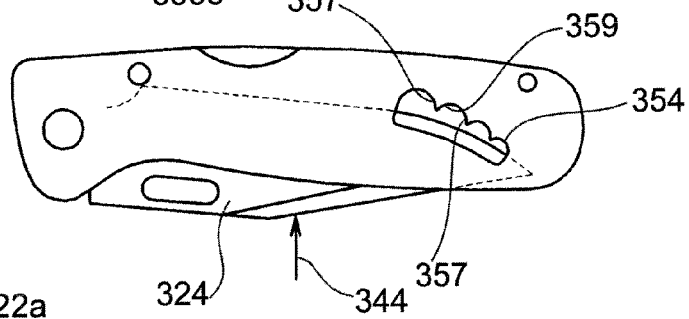
FIG. 12B shows the embodiment in FIG. 12A where the blade is repositioned inwardly into the handle so the blade portion will more closely be positioned to the opposing surface.

There will now be a description of additional embodiments, where similar components will be numbered with similar numerals in the last two digits, and in certain situations followed by letter characters to show the various possibilities which are presented by way of a sampling of numerous types of modifications. Now referring to FIG. 12, there is shown a wire stripping knife 320 having a main body 322 and the blade 324. The lateral opening 356 is defined by the surface 354. In this form, a surface 354 defines extensions 355a-355c, which show one form of dividing the opening 356 into a plurality of partially discrete sectors. As shown in FIG. 12B, the slope portions 357 are sufficient to maintain a wire member contained therein. FIG. 12B shows the positive and negative surfaces 357 and 359 forming a partially concave region to hold a wire therein and maintain its position in one of the sectors during the wire stripping process. As further shown in FIGS. 12A and 12B, in one form when the user applies an external force 344, the blade 324 will reposition toward the surface 354 for a proper depth in sizing the insulation portion of the wire.

Figure 13:
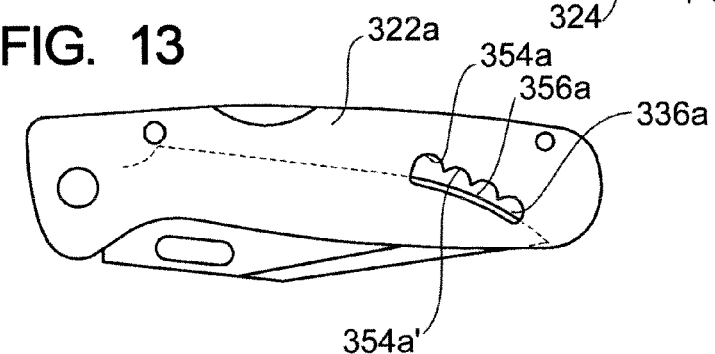
FIG. 13 shows another embodiment where the lateral opening is positioned somewhat closer to the blade edge.

FIG. 13 shows a slight variation where the surface 354a defining the opening 356a is positioned closer to the blade 336a. In this form, upon the natural closing of the blade, with respect to the main housing 322a, the blade portion 336a is within the extended partially circular surface 354a'. In other words, by extending the surface 354a' into a full circle, the circle would intersect the blade portion 336a.

Figure 14:
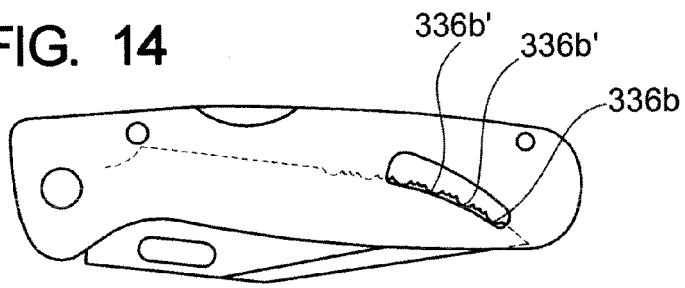
FIG. 14 shows a variation where the edge portion has a plurality of concave surfaces configured to position a wire therein.

Now referring to FIG. 14, there is shown another variation where the edge portion 336b has a plurality of concave surfaces 336b' which are adapted to house a wire member therein. It should be noted that in one form of the various embodiments, the laterally open surface decreases in its lateral width to accommodate various-sized wires to be passed therethrough.

Figure 15:
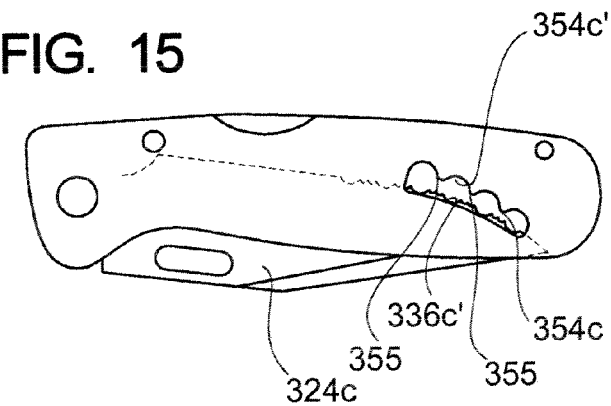
FIG. 15 shows a variation where the blade and the opposing surface are configured to position a wire at various alternate diameter positions.

Now referring to FIG. 15, it can be seen that the surface 354c has discrete regions having the extensions 355. As further shown in this form, there are regions 336c' on the blade 324c which correspond in location to the opposing concave grooves 354c' which are operatively configured to house a wire member therein.

Now referring to FIGS. 16-18, there is shown a wire stripping knife 420. Referring ahead to FIG. 18, it can be appreciated that the wire positioning member 477 is movably attached with respect to the main housing 422 where the laterally extending surface 454 defines the openings 456 which are adapted to have a wire member pass therethrough. As shown in FIG. 17, by applying a force 444, the upper portion of the surface 454 (such as that shown in FIG. 18) is forced downward so any wire positioned therein is in engagement with the edge portion 436 of the blade 424. As shown in FIGS. 16 and 17, the surface 457 defines a lateral opening to access the interior surfaces 454 of the wire positioning member 477.

Referring now to FIGS. 16 and 17, it can be appreciated that the end portions 430 in form are biased in the more open orientation where the openings 456 are positioned away from the edge portion of the blade 424. However, in other forms, the spring member can be biased in the opposite direction where an external force pries the openings away from the blade so that the blade does not occupy the cross-sectional space. Further, the wire positioning member can extend in the area at 431 to provide a lock-back future for the knife. Therefore, this can function as a lock-back mechanism to lock the knife in an open orientation, which is common in the art.

Figure 19A:
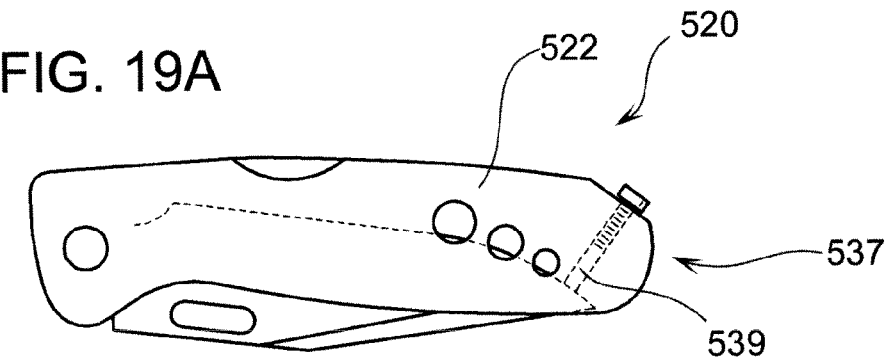
FIGS. 19A-19C show another embodiment where the blade depth adjustment system is schematically shown to adjust the amount of blade depth with respect to the lateral openings.
Figure 19B:
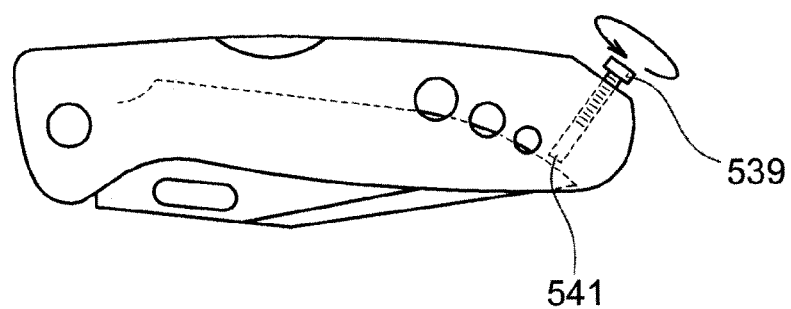
Figure 19C:
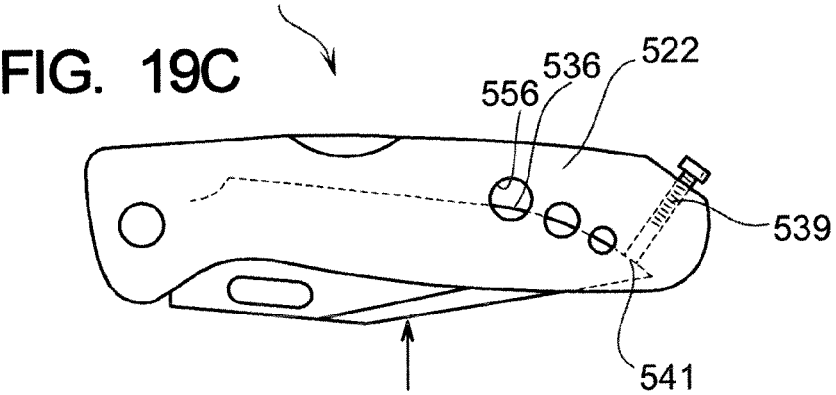

Now referring to FIGS. 19A-19C, there is a wire stripping tool member 520 where there is a blade depth adjustment system 537. In one form, the blade adjustment system can be for example a screw member 539, which is threadedly engaged to the main body 522. In this form, the tip region 541 can, for example, be a mylar or other tip which would not mar the edge portion of the blade. As shown in FIG. 19C, by positioning the adjustment member outward, the edge portion 536 has deeper engagement within the profile of the lateral openings 556.

Figure 20A:
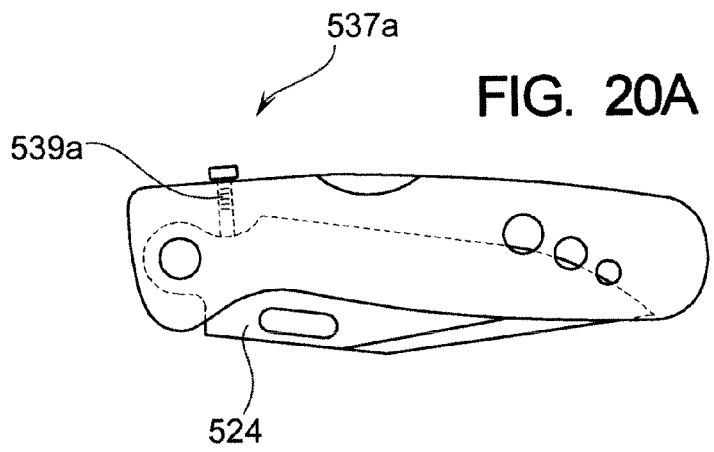
FIGS. 20A-20B shows another embodiment of the blade depth adjustment system which is schematically shown in one form.
Figure 20B:
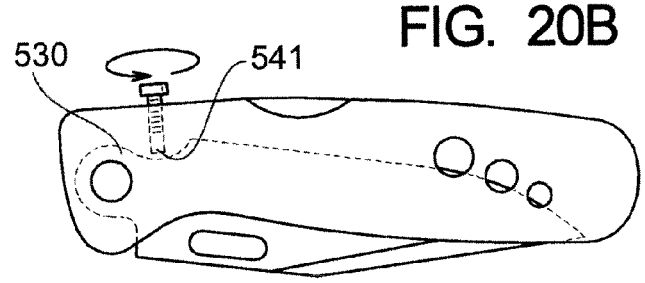

Now referring to FIGS. 20A and 20B, there is shown an adjustment system 537a, which in this form has an adjustment member 539a positioned at a longitudinally inward portion of the blade 524. As shown in FIG. 520, in this form, the tip portion 541 can disengage from the region of the blade indicated at 530, which in one form is not part of the sharpened portion of the blade.

Figure 21:
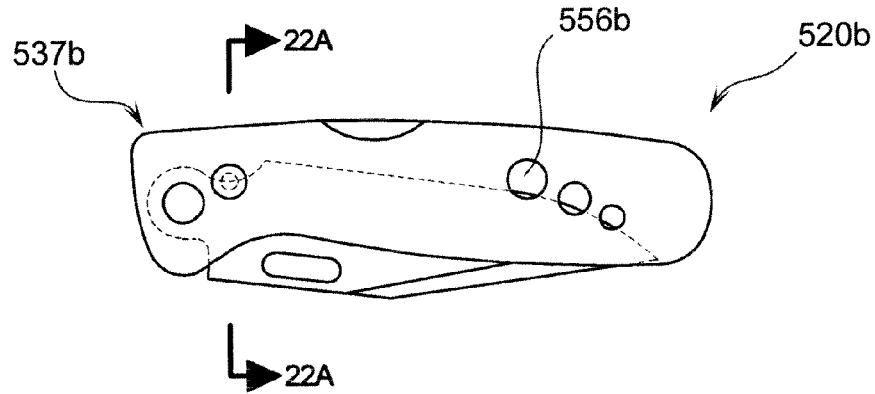
FIG. 21 shows another blade depth adjusting system utilizing a laterally extended member.
Figure 22A:
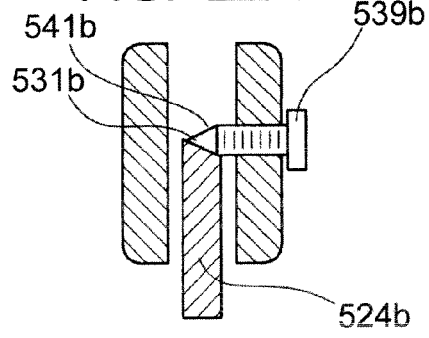
FIGS. 22A-22C show various cross-sectional views taken along line 22A-22A illustrating the principal of the frustoconical surface engaging a portion of the blade to adjust the depth thereof with respect to the handle.
Figure 22B:
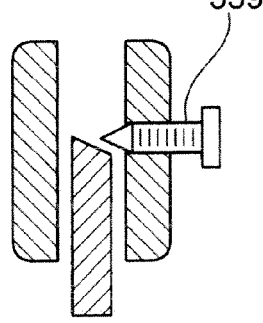
Figure 22C:
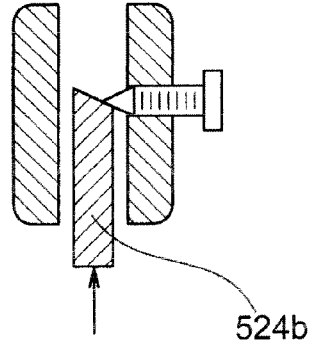

Referring now to FIGS. 21-22C, there is shown another form of a blade depth adjustment system 537b. Referring to FIGS. 22A-22C, in this form, the adjustment member 539b is operatively configured to reposition longitudinally inwardly and outwardly. For example, in FIG. 22A, the frustoconical engagement portion 541b is configured to engage the portion of the surface 531b of the blade 524b. As the adjustment member 539b is repositioned laterally outwardly, it can be appreciated, as shown in FIG. 22C, that the blade 524b can be repositioned further toward the lateral openings 556b as shown in FIG. 21. Of course in another form, the adjustment member can be positioned on the opposing region of the blade, where in a spring-loaded like assembly it can be retracted for extraction of the blade and positioned laterally inwardly to engage the blade to bias the toward the lateral openings.

Figure 23:
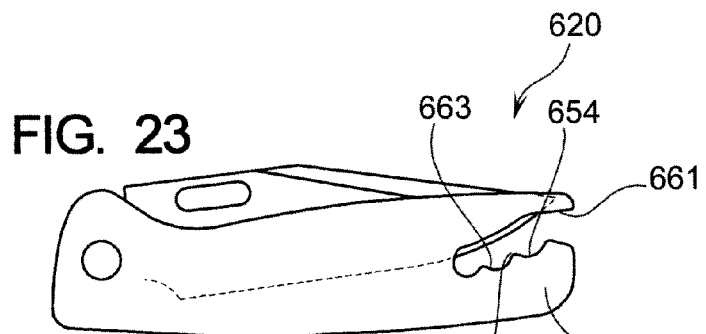
FIG. 23 shows another embodiment where the laterally extending opening has an open region positioned at the longitudinal end portions of the handle member.

Now referring to FIGS. 23-27, there is shown another form of the wire stripping knife 620, where the main body 622, as shown in FIG. 23, has the surface 654 which is positioned at the longitudinally end portion 621 of the main body 622. In this form, the surface 654 defines an open region 661, which is configured to have an insulated wire enter therethrough. In one form, the extensions 655 have adjacent forward and rearward slanting surfaces similar to that shown in FIGS. 12A-15, which are configured to maintain the position of the wire therein to be rotated within the partially cylindrical surface 663.

Figure 24:
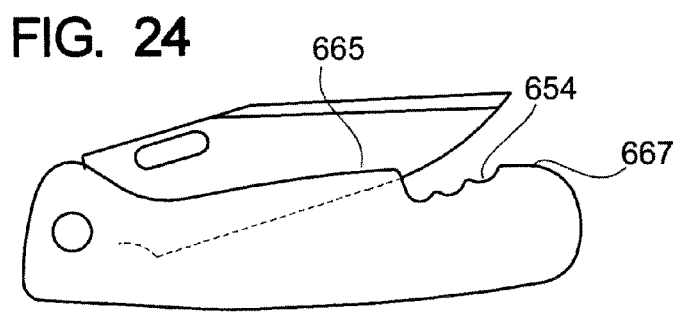
FIG. 24 shows the lateral extending opening with an open region at the blade region of the handle.
Figure 25:
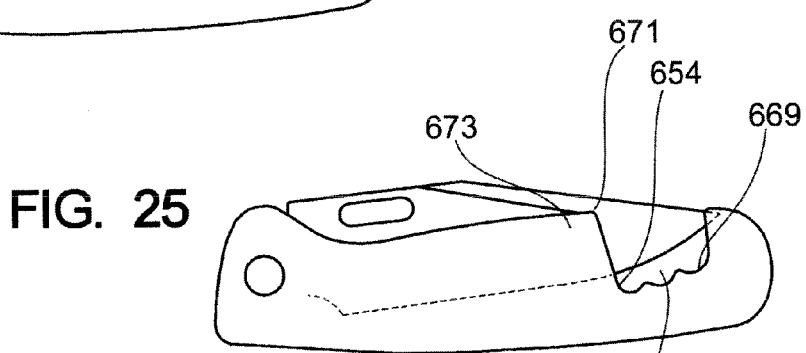
FIGS. 25-27 show various embodiments with different knife profiles where the laterally extended opening is positioned at a transverse central region of the handle and configured to engage the blade at a more closed orientation.
Figure 26:
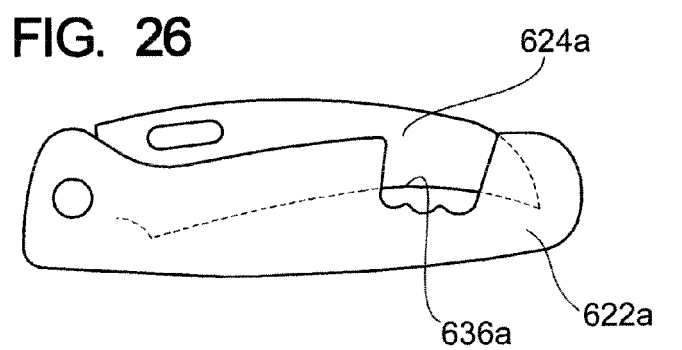
Figure 27:
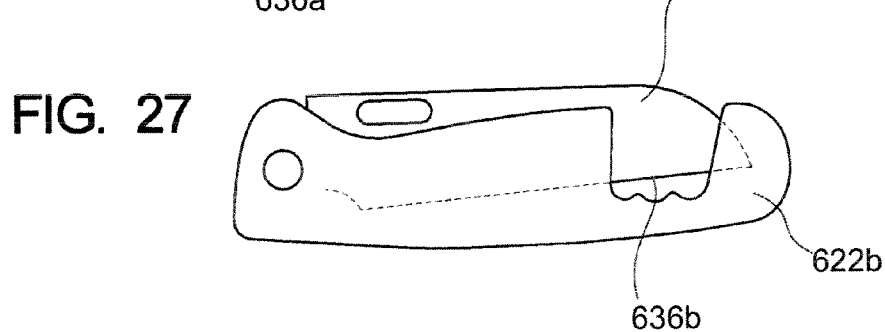

As shown in FIG. 24, the surface 654 defining the lateral opening basically is a lateral opening with respect to the adjacent portions of the handle indicated at 665 and 667, where these portions of surfaces can be at least partially coplanar in a straighter arced-like plane. As shown in FIG. 25, the wire engagement region 669 of the surface 654 define the lateral opening 656 is positioned further within the main body 622 in the transverse direction. FIGS. 26 and 27 show other configurations of the blade member 624a and 624b, which can have a different desirable cutting effect upon the wire positioned therein. Because of the open region 671 located in the first transverse region 673, the wire is positioned in the lateral opening 656, and as shown in FIGS. 25 and 27, the curvature of the blade member 636a and 636b can be in various forms to have different cutting effects upon the wire positioned therein.

It should be further noted that any embodiment, such as that shown in FIGS. 25-27, can also be utilized for cutting wire as well as other objects, such as small branches for a gardening purpose, where the lateral outward surface of the knife is grasped to provide a closing force, thereby incising any object contained within the lateral opening 656. For example, as a conventional pocket knife utility, when it is necessary to snip the end of a plant such as a rose bush, the user can place a rose stem in the lateral opening such (as shown at 656 in FIG. 25) to cut the end portions.

Figure 28A:
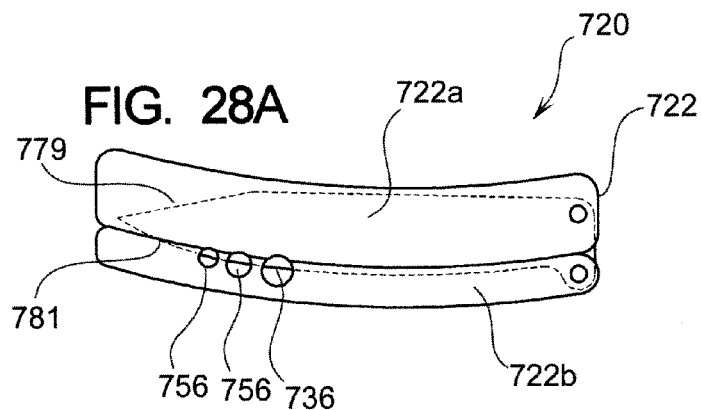
FIGS. 28A-28D shows another embodiment where the handle member is comprised of two pivotally attached portions to form the laterally extended opening.
Figure 28B:
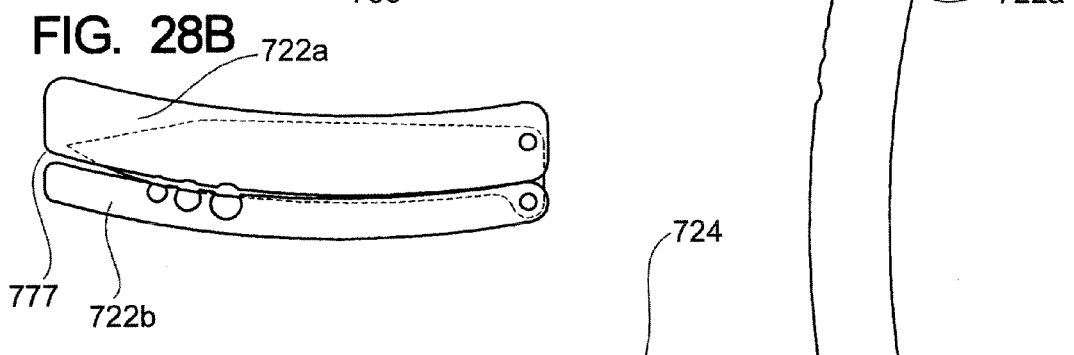
Figure 28C:
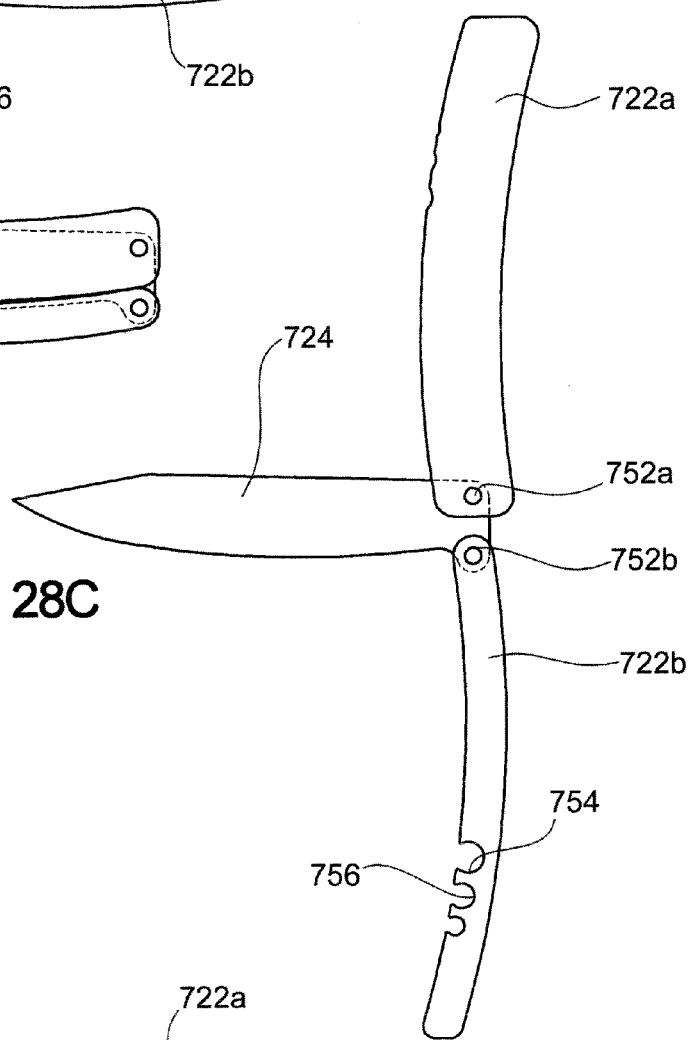
Figure 28D:
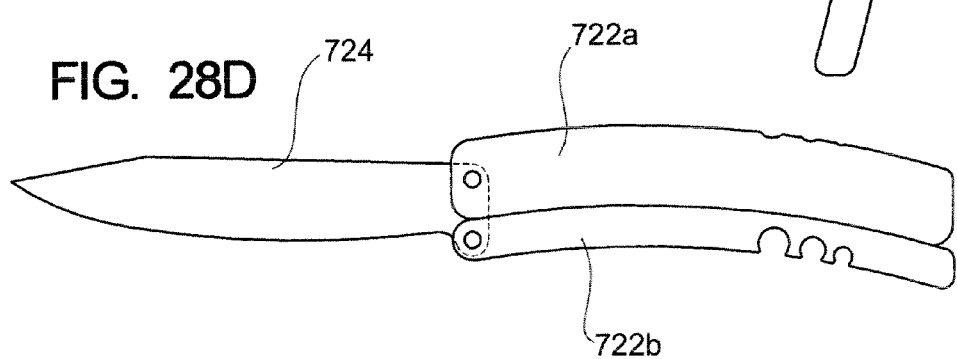

Now referring to FIGS. 28A-28D, there is shown another embodiment where the wire stripping knife 720 comprises a main body 722, which has portions 722a and 722b. As shown in FIG. 28C, the portion 722a and 722b are pivotally attached at the portions 752a and 752b to the blade member 724. Referring to (for example) one of the main body sections 722b, there is the laterally extending surface 754 defining the laterally extending opening 756. It can be appreciated that this embodiment is similar to a balisong knife which is sometimes referred to as a butterfly knife. However, it can be appreciated that the user can grab the knife in the open orientation, such as that shown in FIG. 28D, and reorientate the knife to a closed position, such as that shown in FIGS. 28A and 28B. For example, in the partially fully closed orientation as shown in FIG. 28B, the wire can be inserted at this orientation, or previously inserted through the longitudinal end portion 777, where as the two handle members are slightly spread apart, the wire can be positioned therein. Thereafter, the user can clasp the main body portion 722a and 722b to a fully closed orientation where the edge portion 736 breaks a profile of the lateral openings 756.

Of course, in other forms, the lateral openings could be positioned at the opposing region of the blade member 724, such as that indicated in the region 779. In this form, the secondary blade region can be utilized to do the wire stripping, such as that shown in a similar concept in the embodiments in FIG. 10 and 11 above. In this form, the holes can be completely surrounded at the region 779 where the width of the handle portions can be adjusted so the engagement region between the handles indicated at 71 is positioned at this opposing region of the blade 724.

Figure 29:
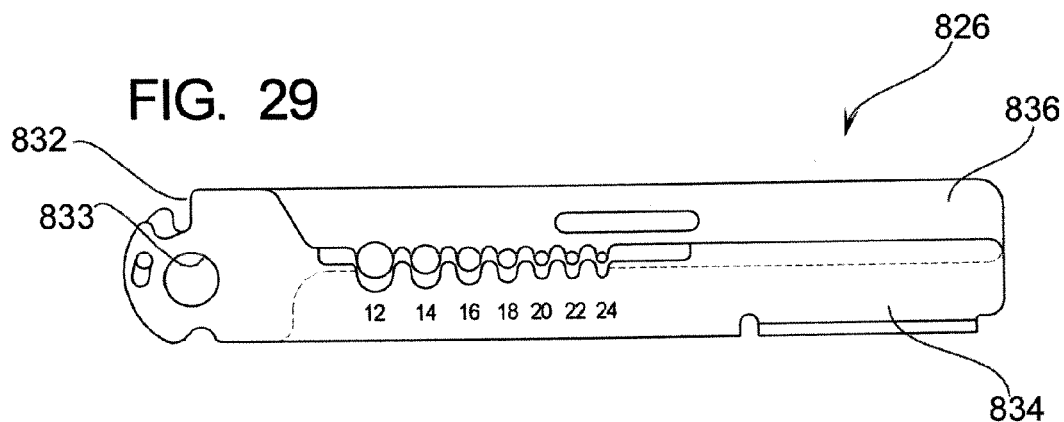
FIGS. 29-31 shows a wire stripping tool member which can be attached to a multitool, such as that shown in FIG. 31, or possibly to a pocket knife.
Figure 30:
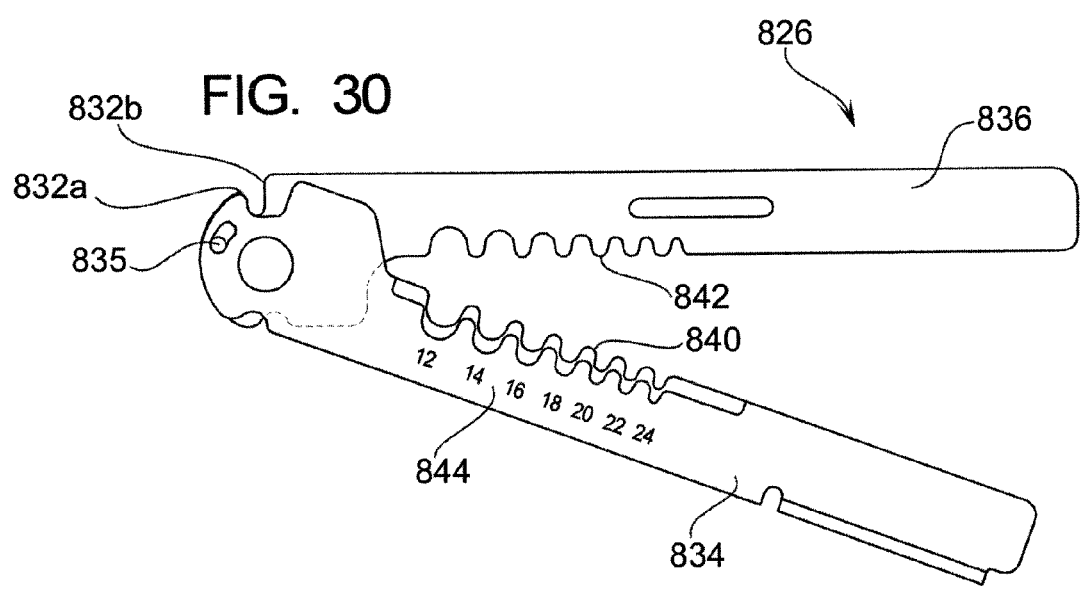
Figure 31:
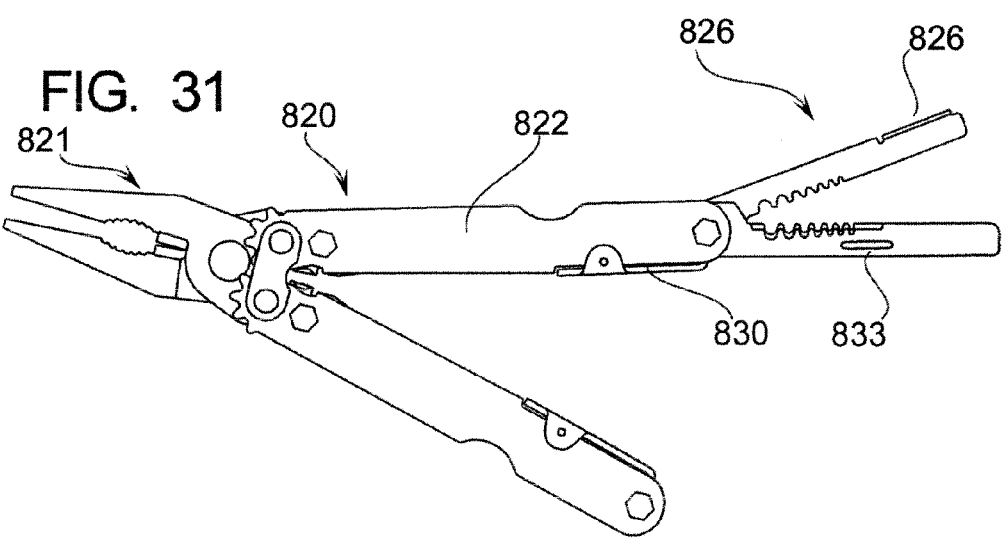

Now referring to FIGS. 29-31, there is another embodiment where the tool member 826 is show. FIG. 31 shows a multitool 820 which in one form is a compound multitool such as that shown in U.S. Pat. No. 6,282,997, which is incorporated herein by reference. Of course, other types of multitools which are not compound linked can be utilized as well. As shown in FIG. 31, the tool member 826 is in an extended orientation. The lock bar 830 in one form is engaging a lock surface 832 such as that shown in FIG. 29. In one form, when the first and second tool members 834 and 836 are separated when the first and second members are in the open orientation, the lock surfaces 832a and 832b as shown in FIG. 30 are arranged so the first member locks and the lock surface 832a has a greater rotational width than the lock surface 832b. Therefore, as shown in FIG. 31, when the tool 826 is extracted (in one form by engaging the surface defining the slot 833), the lock surface 832b of the second member 836 is in a locked orientation where the extending notch of the lock member 830 holds the member in that extended orientation. It can be appreciated that the lock surface 832a has a sufficient tangential width to be in an open orientation as shown in FIG. 30, or a closed orientation as shown in FIG. 29.

Still referring to FIG. 30, it can be seen that the tool member 826 is comprised of a first member 834 and a second member 836. Each of the members has a wire retaining surface 840 and 842 whereby different gauge wires can be placed therein and the display interface 844 indicates the gauge of the wire to be stripped. Either or both of the cutting surfaces 840 and 842 can be utilized to cut the insulation of a wire. In other words, one of the surfaces 840 or 842 can actually cut the wire or both of the surfaces can be used to cut the wire. The first and second tool members are operatively configured to be closed to an orientation such as that shown in FIG. 29 to incise the outer sheath of the wire and strip it in a conventional manner. Of course, in other forms, the tool member 826 can be supplied not only in a multitool but also in a folding knife, or more preferably a folding knife with a knife member and other tools, such as a common multi-function knife.

Referring now to FIGS. 32-37, there is shown another embodiment which refers back to the concept of incorporating a wire stripping embodiment with a lock back bar in somewhat similar manner as that shown in FIGS. 6 and 7 described above.

As shown in FIG. 32 there is a knife 920 having a wire engagement region 921, a main body 922 and a blade member 924. The main body 922 has a base portion 925, which as shown in FIG. 36 in one form is a metallic structure attached to the handle region. The base structure has a cutting portion 927 which is operatively configured to cooperate with the cutting portion 982 of the lock back bar 980 described further herein. In one form, the base portion 925 such as a liner has a surface defining a slot 955 which is configured to engage the spring member which in one form is a leaf spring 957 shown in FIG. 37. In one form, the lateral flange 959 engages the slot 955, and the bar engaging region 961 provides a biasing force on the lock back bar (see FIGS. 32-35).

Figure 36:
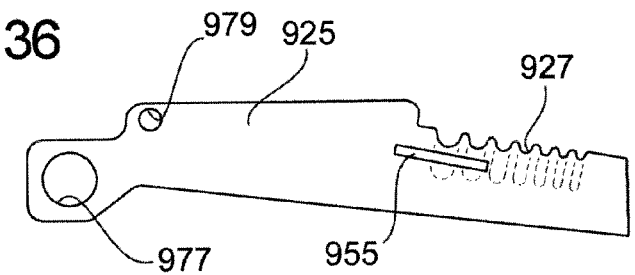
FIG. 36 shows one form of providing a base portion to provide an opposing incising region to the cutting surface of the lock bar.
Figure 37:
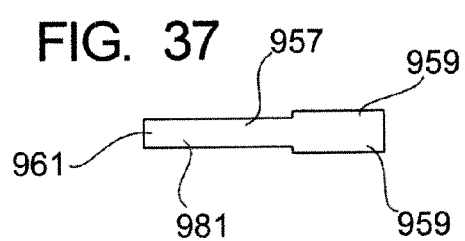
FIG. 37 shows a schematic view of one form of a leaf-like spring to provide a biasing force upon the lock bar.

Therefore, it can be appreciated that the base portion 925 in one form has first and second handle portions positioned on lateral portions of the handle. The lateral flange portions 959 as shown in FIG. 37 of the spring member 957 are defined as first and second portions to operate as a base portion configured to be seated within the receiving slots 955 as shown in FIG. 36 (where two base members 925 would be utilized and positioned on either side of the blade 924 when the blade is in a closed orientation). As shown in FIG. 33, it can be appreciated that the spring member 957 is interposed between the lock back bar and the blade. The base portion, which in one form is the flange member 959, is positioned entirely between the lock back bar and the blade in the longitudinal direction as shown in FIG. 33. This orientation is advantageous because the rearward portion of the knife is not needed to be utilized to mount the spring member to bias the lock back bar. The metallic lining inserts as shown in FIG. 36, which in one form is the base portion 925, can further be utilized to provide a pivot attachment point 977 for the blade member as well as a pivot attachment point 979 for the lock back bar.

Figure 35:
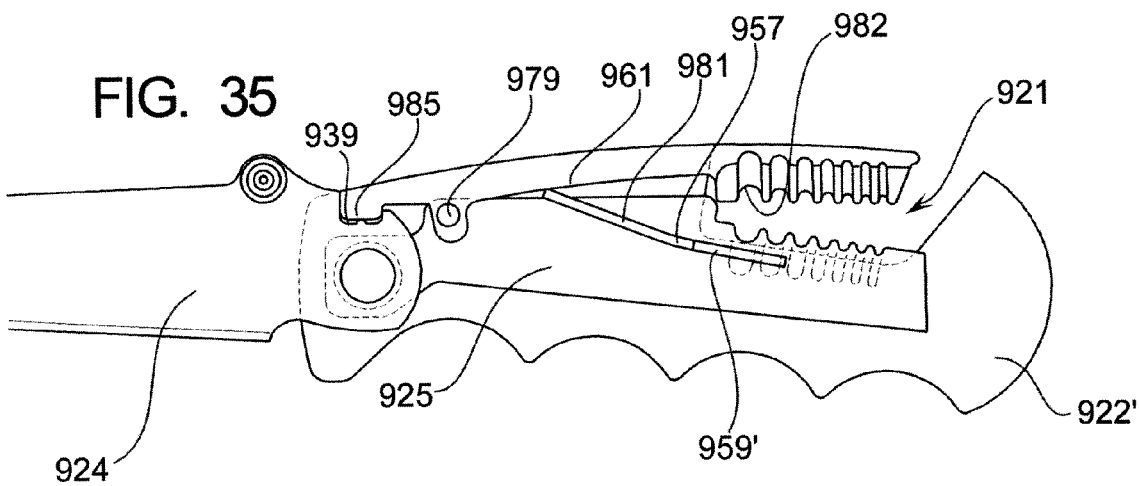
FIG. 35 shows the blade in an extended and locked orientation.

As is further shown in FIG. 35, it can be appreciated that the base portion 959', which in one form is defined by the lateral tabs 959 shown in FIG. 37, is positioned closer to the lock back pivot location 979 which in one form is defined by the base portion 925. It should be noted that the spring portion 981, which is a cantilevered-like spring, can be much shorter and positioned closer to the pivot attachment location 979. For example, the bar engaging region 961 as shown in FIG. 35 is positioned relatively close to the pivot attachment location 979. In other words, the distance between the locations 961 and 979 can be, for example, less than half the total length of the lock back bar in the longitudinal direction and in a preferred form less than one third to 16 of the total length of the lock back bar. Another way of defining the engagement portion 961 with respect to the lock back bar is that the force applied to the lock back bar by the spring is at a location that is less than twice the distance from the pivot point 979 to the engagement between the cam engagement surface 95 and the notch 939. As shown in FIG. 35, the distance is approximately at a ratio of 1:1. In general, by having the base portion 959' closer to the central portion of the handle, as opposed to attaching it in the longitudinally rearward portion indicated at 922' in FIG. 35, allows for the rearward portion to have an attachment such as the stripping bar discussed above.

The blade member 924 has a base region 931 with a cam surface 933. As shown in FIGS. 32-35, the cam surface 933 has a varying distance from the center of rotation 935. For example, the surface 933 comprises the radial outward portion 937 and the notch 939.

Referring now to the lock bar 980, it can be appreciated that the lock bar 980 has the cutting surface 982 which is adapted to engage the insulation portion of a wire. Now referring to FIG. 33, it can be appreciated that a tock bar has a force placed thereon indicated by the vector 981 and the cutting surface 982 and is in closer engagement to the cutting surface 983 of the base portion 925.

Still referring to FIG. 33, it can be appreciated that the cam engagement surface 985 of the lock back bar 980 is disengaged from the cam surface 933 and the blade is more free to rotate to an open orientation such as that shown in FIG. 34. Of course, the blades can overcome the stored energy of the leaf spring member 957 by way of having the radial outward portion 937 rotate the lock back bar 980. As shown in FIG. 35, the blade is in an extended orientation where the extension with the cam engagement surface 985 is in engagement with the notch 939 of the blade 924. Of course, the wire engagement region 921 can be utilized by the operator to strip the wire with the blade in an extended or retracted orientation as shown in FIG. 33.

As shown in FIG. 38, the stripper bar 1080 is in an open orientation, and in this form, the stripper bar is pivotally attached at 1085 to a cross-pin or other similar structure. The stripper bar 1080 has an extension 1087 which in one form is positioned on the opposing region in the longitudinal direction of the pivot portion 1085 from the surfaces 90 and 91. As shown in FIG. 38, it can be appreciated that the stripper bar 1080 can be orientated into a transverse outward direction as well as a transverse inward direction by applying a force upon the outer surface 1089. As noted above, the surfaces 1090 and 1091 cooperate to incise the wire for stripping purposes where either or both can incise a wire such that the opposing surface supplies a counter-force to position and aid in cutting the insulation. In another form, the surfaces are used for cutting the wire or other objects. For example, the surfaces may engage one another or intersect in a shearing action at the longitudinally forward location 1091' and 1090'.

Now referring to FIG. 39, it can be appreciated that the stripper bar 1080 is in a closed orientation and the blade 1024 is in an extended orientation. The extension 1087 is engaging the cam surface 1033 so the stripper bar 1080 is in a closed orientation and is not able to open when the knife blade 1024 is in the open orientation.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A multitool configured to strip the insulation of wire from a core portion, the multitool comprising:

a) a pair of opposed jaw members, a first pivot swingably connecting the jaw members for movement relative to each other, each of the jaw members having a working end portion extending from the first pivot in a first direction and a butt portion extending from the first pivot in a second, generally opposite direction, b) first and second elongated handles each having a channel therein, the jaw members being moveable relative to the handles between an open position in which the jaw member working end portions are exposed and a closed position in which the jaw members are substantially nested in the channels of the handles, c) a wire stripping tool member having first and second members that are pivotally attached to the first handle and share a common pivot on the first handle where the wire stripping tool member is configured to be in a stored orientation within the channel region and an extended orientation where the wire stripping tool member is extended from channel region, the first and second members each having wire engaging surfaces configured to incise insulation of the wire to remove it from the core portion, the first and second members each have locking surfaces operatively configured to engage a lock bar attached to the handle.

2. The multitool as recited in claim 1 where the wire engaging surfaces are positioned opposite one another where the wire engaging surfaces provide a plurality of slots narrowing in diameter to engage wires of different diameters.

3. The multitool as recited in claim 1 where a stop member prevents the rotation of the first and second stripping members such that the first and second stripping members open with respect to one another at a prescribed angle.

4. The multitool as recited in claim 1 where the locking surfaces engage the lock bar when the wire stripping tool member is in an extended orientation.

5. The multitool as recited in claim 4 where the lock surfaces of the first and second members do not coincide in location when the first and second members are in an open orientation and the lock bar disengages the wire stripping tool member to allow the wire stripping tool member to be repositioned to the stored orientation.

6. A wire stripping device configured to strip the insulation of a wire from the core portion, the wire stripping tool member comprising:

a) a U-shaped handle member, b) a first member pivotally attached to the U-shaped handle member, the first member having a wire retaining surface configured to hold a wire therein, c) a second member pivotally attached to the U-shaped handle member and positioned adjacent to the first member, the second member having a wire retaining surface and where a stop member prevents the rotation of the first and second members such that the first and second members open with respect to one another at a prescribed angle, d) whereas the wire retaining surfaces of the first and second members are configured to coincide in location and share a common pivot on the U-shaped handle member such that when the first and second members are in a closed orientation, the wire retaining surfaces of the first and second members cooperate to cut the insulation of a wire placed therebetween for stripping of the insulation from the core portion of the wire, the wire stripping tool member being configured to fit within U-shaped handle when in a stored orientation.

7. The wire stripping tool member as recited in claim 6 where a lock bar is configured to engage first and second lock surfaces on the first and second members respectively.

8. The wire stripping tool member as recited in claim 7 where the first and second members are orientated to an open orientation the lock surface of the second member allows a prescribed amount of rotation of the second member.

9. The wire stripping tool member as recited in claim 7 whereas when the first and second members are separated when the first and second members are in the open orientation, the first and second lock surfaces engage the lock bar where the width of the second lock surface is greater than the width of the first lock surface so the second member has a prescribed range of rotational motion when the first member is locked to the open orientation.

10. The wire stripping tool member as recited in claim 6 where the U-shaped portion of a handle is a handle of a pocket knife.

* * * * *